Figure 1:
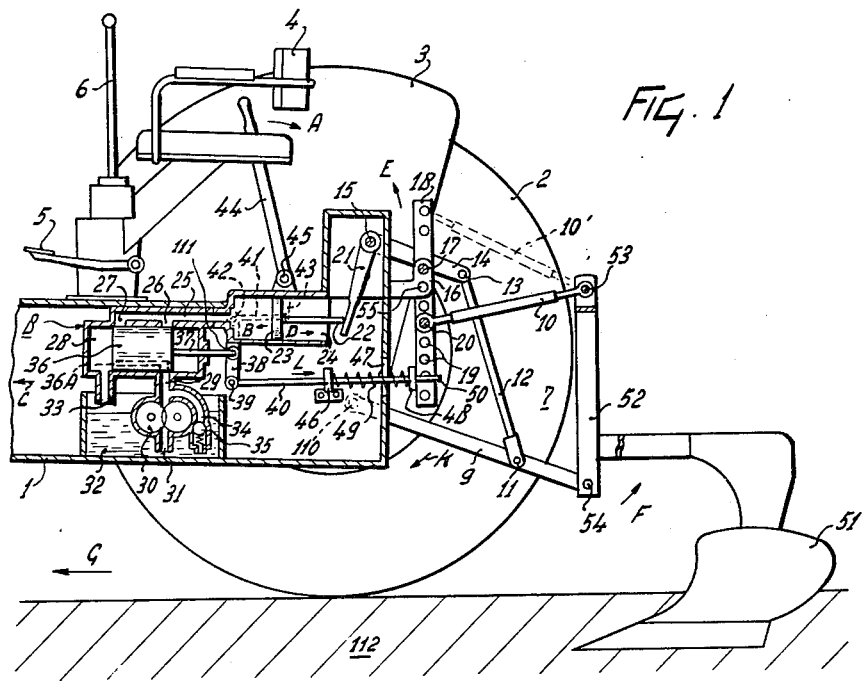

Dec. 7, 1965      C. VAN DER LELY ETAL      3,221,821
LIFTING MECHANISMS FOR TRACTOR-PROPELLED IMPLEMENTS
Filed June 25, 1962                3 Sheets-Sheet 1

INVENTORS
C. VAN DER LELY
C. O. JONKERS
BY F. H. FOCKENS
Mason, Mason & Albright
Attorneys Dec. 7, 1965        C. VAN DER LELY ETAL        3,221,821
LIFTING MECHANISMS FOR TRACTOR-PROPELLED IMPLEMENTS
Filed June 25, 1962                              3 Sheets-Sheet 2
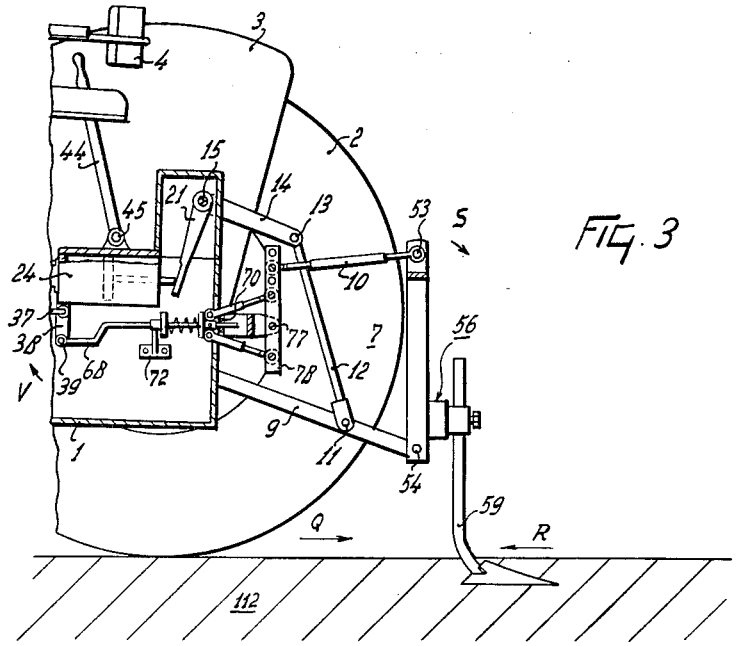
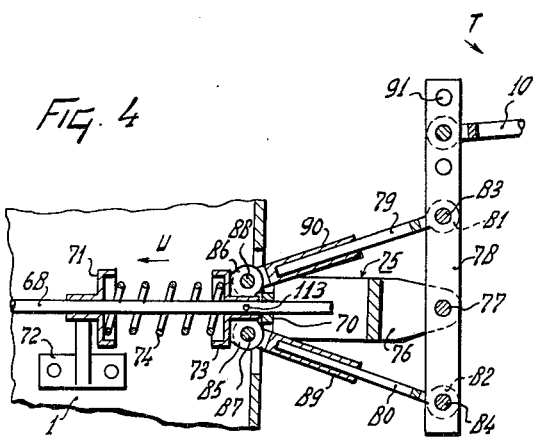
INVENTORS
C. VAN DER LELY
C. O. JONKERS
BY F. H. FOCKENS Dec. 7, 1965  C. VAN DER LELY ETAL  3,221,821
LIFTING MECHANISMS FOR TRACTOR-PROPELLED IMPLEMENTS
Filed June 25, 1962  3 Sheets-Sheet 3

INVENTORS
C. VAN DER LELY
C. O. JONKERS
F. H. FOCKENS
BY
Mason, Mason & Albright
Attorneys United States Patent Office 3,221,821
Patented Dec. 7, 1965

3,221,821
LIFTING MECHANISMS FOR TRACTOR-PROPELLED IMPLEMENTS
Cornelis van der Lely, Zug, Switzerland, and Cornelius Otto Jonkers, Delft, and Foppe Hilbertus Fockens, Maasland, Netherlands, assignors to C. van der Lely N.V., Maasland, Netherlands, a Dutch limited-liability company
Filed June 25, 1962, Ser. No. 205,032
Claims priority, application Netherlands, July 7, 1961, 266,856
8 Claims. (Cl. 172—7)

This invention relates to lifting mechanisms for tractor-propelled implements. More particularly but not exclusively, the invention relates to the case where the implements concerned are agricultural implements arranged to be propelled by agricultural tractors, the term "tractor" will be employed herein to denote a locomotive unit employed to propel an implement which is not necessarily an agricultural implement.

It is known to provide a lifting mechanism for the purpose of interconnecting an agricultural tractor and an agricultural implement in the form of a plow, the tractor being employed to pull th plowshare through the soil. In such a known arrangement, the lifting mechanism comprises a mechanical linkage which, when in normal use, is arranged to be subject to forces (to be referred to herein, for convenience, as "reaction forces") which are dependent upon the external forces to which the plow is subjected, when the plowshare is pulled through the soil by the agricultural tractor. In known arrangements, detecting means is provided which is sensitive to such reaction forces and which is so arranged that, when the said external forces (and therefore also the said reaction forces) exceed predetermined values, then the lifting mechanism is automatically operated to tend to raise the plow relatively to the tractor.

The external forces to which implements are subjected, when propelled by a tractor, depend both upon the nature of the implements concerned, and also upon the manner in which the implement is propelled by the tractor, for example, upon whether an agricultural implement is pulled, or is pushed, through soil by an agricultural tractor.

It is an object of the present invention to provide a lifting mechanism which is more versatile in operation than presently known lifting mechanisms.

According to the invention there is provided a lifting mechanism for interconnecting a tractor and an implement, the lifting mechanism including a mechanical linkage capable of pivotal connection both to the tractor and the implement, and including power means capable of actuating the mechanical linkage so as to tend to raise the implement relatively to the tractor, and including at least one sensitive member capable of transmitting reaction forces determined by and corresponding to external forces which may operate upon the implement when connected to the tractor by means of the lifting mechanism, the mechanical linkage being so arranged that the sensitive member or members is or are capable of transmitting the said reaction forces both when the said external forces act in a first direction and also when the said external forces act in the relatively opposite direction, whereby the power means can be actuated so as to tend to raise the implement, relatively to the tractor, when the said external forces exceed predetermined magnitudes and irrespective of whether the external forces act in the said first direction or in the said relatively opposite direction.

The invention includes a tractor provided with a lifting mechanism according to the invention, and also includes a tractor and an implement interconnected by a lifting mechanism according to the invention.

Figure 2:
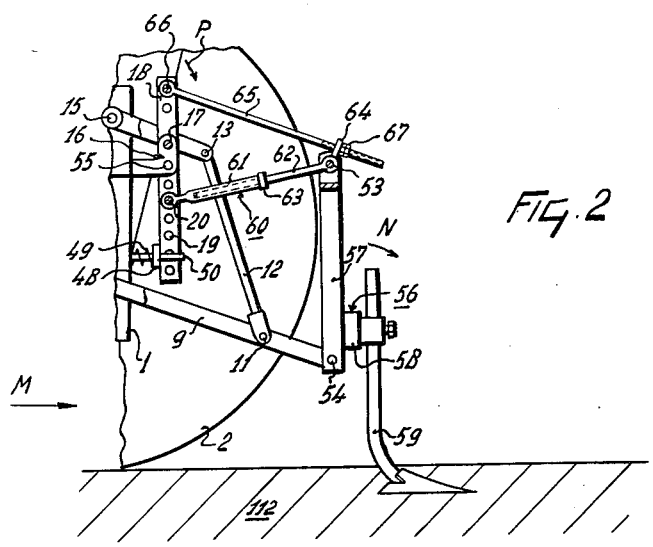
Figure 5:
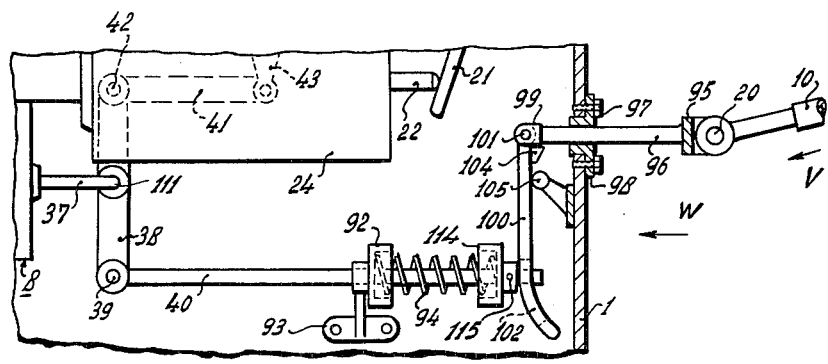

For a better understanding of the invention, and to show how the same may be carried into effect, reference will now be made, by way of example, to the accompanying drawings, in which:

FIGURE 1 is a somewhat diagrammatic, part-sectional side elevation of the rear end of an agricultural tractor coupled to a plow by means of a lifting mechanism according to the invention, FIGURE 2 is similiar to FIGURE 1 but shows a modified form of lifting mechanism interconnecting a tractor and a weeding implement intended to be pushed through the soil by the tractor, FIGURE 3 is similar to FIGURE 2 but shows a further form of lifting mechanism, FIGURE 4 is an enlargement of a part of FIGURE 3, and FIGURE 5 is similar to FIGURE 4 but shows another form of lifting mechanism.

Referring to FIGURE 1, a part of the body of the tractor is indicated at 1. The tractor is provided with suitable land wheels of which one is indicated at 2, this wheel being provided with a mudguard 3.

Upon the body 1 is mounted an assembly comprising a driver's seat 4, suitable tractor-control pedals of which one is indicated at 5, and a tractor steering rod 6. The assembly is arranged to be rotatable about a vertical axis, so as to permit the assembly to be fixed at any one of several angularly spaced positions, relatively to the body 1.

The plow 51 comprises a rigid assembly of generally known form, terminating in a coupling member 52 by means of which the plow can be detachably connected, by means of the lifting mechanism indicated generally at 7, to the body 1 of the tractor. The coupling member is in the form of an isosceles triangle the base of which is horizontal, and the coupling member is detachably connected to the lifting mechanism at three spaced points. Thus, the apex of the triangular coupling member 52 is pivotally connected at 53 to one end of a link 10, while opposite ends of the base of the coupling member 52 are each similarly pivotally connected at 54, respectively, to the outermost ends of a pair of similiar, horizontally spaced levers 9 the innermost ends of which are similarly pivotally connected to the body 1 of the tractor at 110.

A horizontally extending shaft 15 is mounted in bearings (not shown) carried by the body 1 of the tractor. The shaft 15 carries an arcuating arm 21, and also carries a pair of similar, suitably horizontally spaced arms 14, the arms 21 and 14 thus acting in the manner of a bellcrank. The outer ends of the arms 14 are similarly pivotally connected at 13, respectively, to the uppermost ends of a pair of similar, suitably horizontally spaced links 12, the lowermost ends of which are respectively similarly pivotally connected at 11 to the spaced levers 9. It will thus be clear that rotational movement of the actuating arm 21 with the shaft 15 will cause rotational movement of the levers 9 about the pivots 110, thereby raising or lowering the pivots 54 and, consequently, the plow 51.

Two similar, spaced brackets 16 are secured to the rear of the body 1 of the tractor and carry between them a horizontally extending pivot pin 17 upon which is pivoted a vertically extending connection bar 18 provided, both above and below the pivot pin 17, with suitably spaced connection holes 19. That end of the link 10 which is distant from the plow 51 can be pivotally connected to the bar 18, at a suitable point either above or below the pivot pin 17, by means of a pivot pin 20 passed through a suitable one of the holes 19.

A position-detecting rod 40, forming a part of a hydraulic control mechanism which is indicated generally at 8 and which will be described below in greater detail, extends substantially horizontally through an eye formed in a bracket 46 mounted upon the tractor body 1, and terminates in a disc-like stop member 48 from which protrude two similarly horizontally spaced arms 50 between which the lower end of the connection bar 18 is received. A compression spring 49 surrounds the rod 40 and extends between the bracket 46 and the stop member 48.

It will thus be appreciated that, assuming for the moment that the levers 9 are held stationary, so that the pivots 54 remain fixed in position relatively to body 1 of the tractor, then the connection bar 18, which is pivotable about the pivot pin 17, will tend to take up an angular position of equilibrium, under the action of two opposing torques. The first of these torques is generated by the force exerted upon the lower end of the connection bar 18 by the compression spring 49, through the intermediary of the stop member 48 which is pressed towards the bar 18 by the compression spring. The second of the torques is generated by the force exerted upon the bar 18 by the link 10.

As will be described below in greater detail, the rod 40 acts as a position-detecting means which is continuously sensitive to the angular position of the connection bar 18. Thus the action of the compression spring 49 ensures that the stop member 48 is, during normal operation of the device, always held against the connection bar 18. Since the stop member 48 is rigidly attached to the rod 40, the position of the rod 40 is thus determined by the angular position of the connection bar 18 the position of which, in turn, is determined by the relative magnitudes of the two opposing torques referred to above. Changes in the position of the rod 40 result, as will next be described, in operation of the hydraulic control mechanism 8 to change the angular position of the actuating arm 21, and thus result in raising or lowering of the pivot points 54 and thus of the plow, the arrangement being such that this raising or lowering tends to cause the connection bar 18 to return to a predetermined equilibrium position.

The hydraulic control mechanism 8 comprises a hydraulic control valve in the form of a piston-like valve member 36 slidable within a corresponding cylinder-like valve body 28, a linear hydraulic motor in the form of a single-acting piston 23 which is slidable within a corresponding cylinder 24 and which is provided with a piston rod 22 capable of engaging the arm 21, a supply tank 32 acting as a source of suitable hydraulic fluid, for example a suitable oil, a gear pump 30, and a pressure-relief valve 35. As may be seen from FIGURE 1, the valve body 28 is provided at its lower side with a supply passage 29 which is connected both to the outlet of the gear pump 30 the inlet of which is supplied with hydraulic fluid from the tank 32 by way of a passage 31, and which is also connected, by way of a passage 34, to the pressure-relief valve 35 which is arranged to connect the outlet of the gear pump 30 to the tank 32, should the hydraulic fluid pressure within the supply passage 29 exceed a predetermined value. The valve body 28 is also provided, at its lower side, with an exhaust passage 33 which leads into the supply tank 32.

At its upper side, the valve body 28 is provided with a pair of spaced ports 26 and 27 which communicate with a passage 25 leading to the interior of the cylinder 24.

In FIGURE 1, the valve member 36 is shown in its neutral position wherein, as shown, the ports 26 and 27 are both closed, and the supply passage 29 is connected to the left-hand end of the valve body 28 through a passage 36A formed within the valve member 36. Since, as shown in the figure, the passage 33 is not sealed by the valve member 36, hydraulic fluid from the outlet of the pump 30 is therefore returned to the tank by way of the passages 29, 36A and 33.

The valve member 36 is provided with an actuating rod 37 by means of which, as will be described below, the valve member 36 can be moved either to the left or to the right (as viewed in FIGURE 1), within the valve body 28. The arrangement is such that, when the valve member is moved sufficiently far to the left, the passage 29 and the port 26 are both uncovered and put into communication, whereby the pump 30 supplies hydraulic fluid to the cylinder 24 to tend to cause the piston 23 to move to the right (as seen in FIGURE 1). When the valve member 36 is moved sufficiently far to the right, the port 27 is uncovered and put into communication with the exhaust passage 33, whereby hydraulic fluid within the cylinder 24 is permitted to return the tank 32, by way of the passages 25 and 33.

Such movement of the valve member 36 by the actuating rod 37 can be effected either manually or automatically. Thus, the rod 37 is pivotally connected at 111 (this particular arrangement being shown more clearly in FIGURE 5) to a vertically extending lever 38. The lower end of the lever 38 is pivotally connected at 39 to that end of the position-detecting rod 40 which is distant from the stop member 48, while the upper end of the lever 38 is pivotally connected at 42 (see FIGURES 1 and 5) to one end of a horizontally extending link 41 the opposite end of which is pivotally connected to the lower end 43 of a manually operable control lever 44 which is pivotally connected to the tractor body 1 at 45.

It will thus be seen that clockwise movement of the control lever 44, in the direction of the arrow A, will result in counter-clockwise movement of the lever 38 about the pivot 39, in the direction of the arrow B, such that the valve member 36 will be moved to the left by the actuating rod 37, this resulting (as described above) in movement to the right of the piston 23, in the direction of the arrow D. The resulting force exerted by the piston rod 22 upon the actuating arm 21 will result (as described above) in operation of the lifting mechanism to raise the pivots 54 and therefore the plow 51.

Counter-clockwise movement of the control lever 44, in the direction opposite to that of the arrow A, will similarly result in movement to the right of the valve member 36, whereupon (as described above) hydraulic fluid is permitted to escape from the cylinder 24, the piston 23 being permitted to move to the left, so as to permit the lifting mechanism to allow the pivots 54 and the plow 51 to move downwards, under the action of forces to be described below.

The control lever 44 is normally held in the neutral position shown in FIGURE 1, by restraining means (not shown). In this case, the position of the pivot 42 therefore remains fixed. Longitudinal movement of the position-detecting rod 40 (as described above), in response to changes in angular position of the connection bar 18, will therefore result in pivotal movement of the lever 38, about the pivot 42. It will therefore be clear that angular movement of the connection bar 18 produces effects similar to those produced by angular movement of the control lever 44. Thus, clockwise movement of the connection bar 18, in the direction of the arrow K, will cause the pivots 54 and the plow 51 to be raised, while counter-clockwise movement of the bar 18 will permit lowering of the pivots 54 and the plow 51.

The apparatus of FIGURE 1 operates as follows. If the tractor is driven in the direction of the arrow G, so as to pull the plow 51 the soil 112 in generally known manner, then it is normally found that external forces operate upon the plow in such a way as to tend to cause the plow to rotate in an counter-clockwise direction about the pivots 54, in the direction of the arrow F. The plow thus normally tends to move upwards through the soil 112 and, for correct operation of the plow, such upward movement must be resisted. The necessary resistance is effected, in the present case, by the action of the compression spring 49.

That arrangement of the apparatus of FIGURE 1 is such that the external forces just referred to, which include forces of resistance to the passage of the plow 51 through the soil 112, result in corresponding reaction forces in the link 10; in the present case, with the link 10 pivotally connected (as shown in full lines in FIGURE 1) to a connection hole 19 of the connection bar 18 which lies below the pivot pin 17, these reaction forces will act towards the left (in FIGURE 1) along the link 10, thus tending to cause clockwise movement of the connection bar 18. Such movement of the bar 18 is, however, opposed by the action of the compression spring 49 upon the bar 18, and the arrangement is such that, under normal conditions, the bar 18 will tend to take up an equilibrum angular position at which two conditions are simultaneously fulfilled:

(1) the oppositely directed torques exerted upon the bar 18 by the spring 49 and the reaction forces in the link 10 are of equal magnitude, and also (2) the position-detecting rod 40 lies at such a position that the valve member 36 lies in its neutral position, where the ports 26 and 27 are both covered and the hydraulic control mechanism 3 is therefore not operated either to raise, or to permit lowering of the pivots 54 and the plow 51.

If the external forces acting upon the plow 51 increase, the tendency of the plow to rotate about the pivots 54, in the counter-clockwise direction of the arrow F, increases; and as a result, the reaction forces acting along the link 10 increase. The increased torque exerted upon the connection bar 18, by the link 10, causes the link 18 to move pivotally, in the clockwise direction of the arrow K, about the pivot pin 17, this pivotal movement takes place against the action of the compression spring 49, and results in compression of that spring. Furthermore (as described above) this angular movement of the connection bar 18 is detected by the position-detecting rod 40, and results in operation of the hydraulic control mechanism and of the lifting mechanism, in such a way as to effect raising of the pivots 54. The resulting raising of the plow 51 through the soil 112 normally tends to result in a decrease of the external forces acting upon the plow-share, so that the torque exerted upon the connection bar 18, by the reaction forces acting along the link 10, normally tends to decrease, so permitting the bar 18 to tend to be returned to the equilibrium position (2) mentioned in the last paragraph, under the action of the restoring torque exerted upon the bar 18 by the spring 49.

Under normal conditions, such automatic raising of the pivots 54, and therefore of the plow 51 will continue until the conditions (1) and (2), referred to above, are again simultaneously fulfilled.

Should the external forces acting upon the plow 51 decrease, then the plow tends to rotate less forcefully about the pivots 54, in the counter clockwise direction of the arrow F. As a result, the reaction forces exerted by the link 10, upon the connection bar 18, tend to decrease. Consequently the torque exerted upon the bar 18 by the link 10 decreases, permitting the bar 18 to move pivotally about the pivot pin 17, in an counter clockwise direction, under the action of the torque exerted upon the bar 18 by the spring 49. This pivotal movement of the bar 18 is again detected by the position-detecting rod 40 which, in this case, moves to the right, in the direction of the arrow L. As a result, as described above, the cylinder 24 of the linear hydraulic motor is connected, by way of the passages 25 and 33, to the tank 32, the piston 23 and piston rod 22 are therefore free to move to the left, in the direction opposite to that of the arrow D. Under normal conditions, the pivots 54 will therefore descend, together with the plow 51; such descent is effected by forces which tend to rotate the actuating arm 21 clockwise, about the axis of the shaft 15, these forces including the weight of the plow 51 and forces arising from the torque exerted upon the bar 18 by the compression spring 49.

To avoid instability of the automatic-control system just described, a "dead-zone" of operation may be introduced, such that small changes in the magnitudes of the external forces acting upon the plow 51 do not result in automatic raising or lowering of the pivots 54. In the arrangement of FIGURE 1, the "dead-zone" is introduced by arranging that, upon movement of the valve member 36 to the left or to the right, the port 26 is not put into full communication with the supply passage 29, and the port 27 is not put into full communication with exhaust passage 33, respectively, until a suitable predetermined minimum movement of the valve member 36 has been effected, in the relevant direction.

It will be recalled that the coupling member 52 of the plow 51 is detachably connected to the lifting mechanism by the three pivots 53 and 54. The coupling mechanism can therefore be connected to implements other than the plow 51, and an example of such an implement is the weeding implement 56 shown in FIGURE 2 and comprising a coupling member 57 (similar to that, 52, described with reference to FIGURE 1, a mounting member 58, and a weeding tool 59 the position of which is adjustable, relatively to the mounting member 58.

The weeding implement 56 is intended to be pushed through the soil 112 by the tractor, when the tractor is moving in the direction of the arrow M (FIGURE 2).

Referring now to FIGURE 1, suppose that the plow 51 is replaced by the weeding implement 56 of FIGURE 2. When the tractor of FIGURE 1 is driven to the right, in the direction opposite to that of the arrow G, the weeding implement is normally subjected to the action of external forces which, in this case, unlike the case where the tractor is employed to pull the plow through the soil, tend to cause the weeding implement to rotate about the pivot 54, in the clockwise direction opposite to that of the arrow F. The weeding implement, therefore, normally tends to move downwards into the soil 112 and, for correct operation of the weeding implement, such downward movement must be resisted. The necessary resistance is again effected by the action of the spring 49 but it will be seen that, in order to permit the required control of the weeding implement, the link 10 must in this case be pivotally connected (as shown in broken lines at 10 in FIGURE 1) to the connection bar 18 at a suitable point above the position of the pivot pin 17.

With the link 10 in the position 10' and when the tractor is pushing the weeding implement, the operation of the arrangement is very similar to that previously described. In this case, the external forces which act upon the weeding implement 56, and which tend to rotate the implement about the pivots 54 in a clockwise direction, result in corresponding reaction forces being generated in the link 10 in the position 10'. The presence of the pivotal connection between the link 10 and the bar 18 causes these reaction forces to exert a torque upon the bar 18, this torque tending to rotate the bar 18 about the pivot pin 17, in the clockwise direction of the arrow K. Such rotation of the bar 18 is, however, opposed as before by the opposing torque exerted upon the bar 18 by the action of the compression spring 49.

The operation of this arrangement is thus very similar to that previously described. The bar 18 tends to take up an equilibrium angular position at which the conditions (1) and (2), referred to above, hold simultaneously. Changes in the external forces acting upon the weeding implement 56 tend to cause displacement of the bar 18 from this equilibrum position, and the arrangement is such that an increase in the external forces automatically causes the pivots 54 to be raised by the lifting mechanism, to raise the weeding implement, while a decrease in the external forces is arranged, as before, to permit the pivots 54, and therefore the weeding implement 56, to move deeper into the soil under the action of forces which include the weight of the weeding implement and the spring force of the spring 49.

The provision of two or more connection holes 19 in both the upper and the lower parts of the connection bar 18, permits the link 10 to be pivotally connected to the bar 18 at such a position that the equilibrium angular position of the bar 18 corresponds to a suitable desired penetration of the tractor-propelled implement, either the plow or the weeding implement, into the soil 112.

It will be appreciated that when the link 10 is connected, as shown in full lines in FIGURE 1, to the lower end of the connection bar 18, then the link 10 is intended to act as a strut the length of which tends to be compressed under the action of the reaction forces referred to above, and of opposing forces derived from the compression spring 49. On the other hand, when the link 10 is connected, as shown at 10' in FIGURE 1, to the upper end of the connection bar 18, then the link 10 is intended to act as a tie the length of which tends to be increased under the action of the reaction forces referred to above, and of opposing forces derived from the compression spring 49.

In other words, when the lifting mechanism of FIGURE 1 is arranged for the control of a plow 51 which is being pulled through the soil by the tractor, then suitable control is attained by using the link 10, in the full-line position, as a strut. When, however, the lifting mechanism of FIGURE 1 is arranged for the control of a weeding implement 56 which is being pushed through the soil by the tractor, then suitable control is attained by using the link 10, in the broken line position 10', as a tie. The bar 18 can be locked against pivotal movement by inserting a pin through the holes 55 in the brackets 66 and a corresponding hole in the bar 18.

Referring now to the arrangement of FIGURE 2, the lifting mechanism shown there differs from that of FIGURE 1, only in that the link 10 (as shown in FIGURE 1 in full-lines) is replaced by a strut which is indicated at 60 and which is capable of transmitting forces only when under compression, and in that the link 10' (as shown in FIGURE 1 in broken lines) is replaced by a tie 65 which is capable of transmitting forces only when under tension.

Thus, the strut 60 is formed in two parts, one of which, a socket-like member 61, can be pivotally connected at 20 to any suitable one of the connection holes 19 in the lower end of the connection bar 18, the member 61 being designed to receive the spigot of a male member 62, one end of which is detachably pivotally connected at 53 to the coupling member 57 which also carries an eye 64. The strut 60 cannot be put in tension, since the members 61 and 62 are capable of mutually outward movement, but the provision of a stop member 63 upon the male member 62 permits the strut 60 to be put in compression.

One end of the tie 65 can be pivotally connected at 66 to a suitable one of the holes 19 formed in the upper part of the connection bar 18. The other end of the tie 65 passes, with suitable clearance, through the aperture of the eye 64, and is screw-threaded to receive two nuts 67. It will be clear that the tie 65 cannot be put in compression, since the eye 64 is capable of moving towards the pivot 66, but can be put in tension, when the eye 64 engages one of the nuts 67.

The operation of the arrangement of FIGURE 2 is very similar to that of FIGURE 1, and will therefore be described only very briefly. As shown in FIGURE 2, wherein the lifting mechanism is in a neutral position, if the tractor is driven in the direction of the arrow M to push the weeding implement 56 through the soil 112, then, as described with reference to FIGURE 1, the implement 56 will normally tend to rotate about the pivots 54, in the clockwise direction of the arrow N. As a result, the resulting reaction forces referred to in connection with FIGURE 1, and an opposing force deriving from the compression spring 49, will put the tie 65 in tension, whereas the two parts 61 and 62 of the strut 60 will tend to separate. It may thus be seen that, in such circumstances, the arrangement of FIGURE 2 operates in the manner of FIGURE 1, as described with reference to the case where the link 10 lies in the broken-line position 10'.

Where, in the case of FIGURE 2, the weeding implement 56 is replaced by the plow 51 of FIGURE 1, and the tractor of FIGURE 2 is driven in the direction opposite to that of the arrow M, so as to pull the plowshare through the ground, then, as described with reference to FIGURE 1, the plow will tend to rotate about the pivots 54, in the counter-clockwise direction of the arrow F (FIGURE 1). In this case, the resulting reaction forces referred to in connection with FIGURE 1, and an opposing force derived from the compression spring 49, will put the strut 60 in compression, whereas the eye 64 will tend to separate from the nuts 67 upon the tie 65. In these circumstances, then, the arrangement of FIGURE 2 will operate in the manner of FIGURE 1, as described with reference to the case where the link 10 lies in the full-line position.

In summary, the arrangement of FIGURE 2 thus differs from that of FIGURE 1, in that the lifting mechanism of FIGURE 2 automatically operates in the required manner, irrespective of whether the tractor is employed to pull, or to push, an implement through the soil 112. In the case of the arrangement of FIGURE 2, the relatively opposite direction of the torques, which act upon the implements as a result of the action of external forces, according to whether the implement is pulled or pushed by the tractor, are automatically allowed for. Thus, irrespective of whether the implement is being pulled or pushed by the tractor, an increase of the normal external forces acting upon the implement will always result in the implement tending to be lifted upwards, while, in addition, a decrease of such external forces will tend to permit the implement to move downwards into the soil 112. In the case of the arrangement of FIGURE 1, however, the link 10 must be transferred from the full-line position to the broken-line position 10' when an implement is to be pushed rather than pulled by the tractor, and vice versa.

The arrangement of FIGURES 3 and 4 is generally similar to that of FIGURE 2, but differs in that the connecting bar 78 (which is similar to that, 18, of FIGURES 1 and 2) is in this case pivotally mounted upon a pivot pin 77 which extends between the bifurcated ends 76 of a bracket 75 secured to the tractor body 1, and in that a link 10 (similar to that of FIGURE 1) can be pivotally connected to any one of several connection holes 91 at the upper end of the connection bar 78, and in that the compression spring 74 (which acts similarly to that, 49, of FIGURES 1 and 2) acts upon the connection bar 78 in a manner somewhat different from that described with reference to FIGURES 1 and 2.

Thus, in the case of FIGURES 3 and 4, a cranked position-detecting rod 68 (generally similar to the rod 40 of FIGURES 1 and 2) is pivotally connected at 39 to the lever 38, and passes through the central hole in a dished collar 71 which is mounted, by way of a bracket 72, upon the tractor body 1. In order to alter the tension of the spring 74, the collar may be mounted displaceable on the tractor body.

The position-detecting rod 68 carries, near its opposite end, a second dished collar 73 which is pinned to the rod 68 at 113, and this end of the rod 68 extends, with suitable clearance, through a bearing 70.

The compression spring 74 surrounds the rod 68 and extends between the collars 71 and 73.

The collar 73 carries, respectively above and below, a pair of ears, 86 and 85, to which are respectively pivotally connected, at 88 and 87, the inner ends of a pair of links, 90 and 79, and 89 and 80, the outer ends of which are bifurcated, respectively at 81 and at 82, and are respectively pivotally connected, at 83 and 84, to the connection bar 78.

The links 90 and 79, and 89 and 90, are each of similar form to the strut 60 described with reference to FIGURE 2, and each can be put in compression but not in tension. Thus, each link comprises a socket-like member, 90 or 89, designed to receive a spigot member, 79 or 80, respectively. Each of the links can be put in compression when the relevant spigot penetrates fully into the associated socket-like member.

The operation of the arrangement of FIGURES 3 and 4 is very similar to that of FIGURE 2. As shown in FIGURES 3 and 4, the lifting mechanism is in its neutral position. When the tractor is driven in the direction of the arrow Q (FIGURE 3) to push the weeding implement 56 through the soil 112, the weeding implement normally behaves as described above, so that external forces acting upon the weeding implement cause corresponding reaction forces to be transmitted through the link 10, whereby a resulting torque tends to cause the connection bar 78 to rotate clockwise (as seen in FIGURES 3 and 4), about the pivot pin 77. Such rotation tends to be opposed by the action of the compression spring 74, and it will be seen that the link 89, 80 is thus put in compression while the parts 90 and 79 of the link 90, 79 tend to move apart and become ineffective. Under the action of the opposing torques, the connection bar 78 tends to take up an equilibrium angular position at which the conditions (1) and (2) referred to above are simultaneously fulfilled. Thereafter, the operation of the arrangement is as described with reference to FIGURE 2.

If, with the arrangement of FIGURE 3, the weeding implement 56 is replaced by the plow 51 of FIGURE 1, and the tractor of FIGURE 3 is driven in the direction opposite to that of the arrow Q, so as to pull the plowshare through the soil 112, then, as described above, the plowshare will normally tend to rise in the soil 112, and corresponding reaction forces will be transmitted through the link 10, to produce a torque which tends to rotate the connection bar 78 in a counterclockwise direction (as seen in FIGURES 3 and 4). In this case, then, the link 90, 79 will be put in compression, while the parts 89 and 80 of the link 89, 80 will tend to move apart and to become ineffective. Control of the height of the plow relatively to the tractor is thereafter automatically effected as described with reference to FIGURE 2.

The alternative form of lifting mechanism which is illustrated by FIGURE 5 is similar to that of FIGURES 3 and 4, but differs in that the connection bar 78 and the two compression-only transmitting members 90, 79 and 89, 80 of FIGURES 3 and 4 are replaced by a linkage mechanism having two different modes of operation.

Thus, the position-detecting rod 40, one end of which is pivotally connected at 39 to the lever 38, and which extends through the central holes of a dished collar 92 which surrounds the rod 40 and which is secured to the tractor body 1 by means of a bracket 93. The rod 40 carries, at its outer end, a dished collar 114 which is pinned to the rod 40 at 115. A compression spring 94 extends between the collars 92 and 114. In order to alter the tension of the spring 94, the collar 92 may be mounted displaceable on the tractor body.

The link 10 (FIGURE 5) is arranged as in FIGURE 3, but is in this case pivotally connected at 20 to one end of the 2-mode linkage mechanism. This linkage mechanism comprises a rod 96 which is mounted in a bearing 98 (secured by bolts 97 to the tractor body 1) so as to be capable of moving in the direction of the length of the rod 96, the rod 96 being bifurcated at each of its ends 95 and 99, respectively, where the rod 96 is respectively pivotally connected, at 20 and 101, to the link 10 and to an arm 100. The arm 100 is provided at its lower end with an elongated slot 102, through which the outer end of the position-detecting rod 40 extends.

A stop member 104 secured to the arm 100 prevents the arm 100, when pivoting about the pivot 101, from approaching the rod 96 more closely than is defined by a predetermined minimum angular separation of the rod 96 and the arm 100.

A rounded fulcrum member 105 is suitably secured to the tractor body 1, and is arranged to act, in one of the two modes of operation of the linkage mechanism, as a fulcrum for the arm 100.

The operation of this arrangement is generally similar to that of FIGURE 3. Thus, when, as described above, the tractor is employed to pull a plow, it is normally the case that external forces acting upon the plow result in reaction forces being transmitted along the link 10, in the direction of the arrow V (FIGURE 5); the result will be that the link 10 will tend to push the rod 96 to the left (in the direction of the arrow W), so that the arm 100 will also tend to move to the left, out of contact with the fulcrum member 105. The arm 100 approaches the rod 96, by pivoting about the pivot 101, until the stop member 104 prevents further approach of the arm 100 towards the rod 96. Thereafter, in this mode of operation of the 2-mode linkage mechanism, the arm 100 and the rod 96 behave as a single rigid member which is capable of movement, as a whole, from right to left in the direction of the arrow W, or in the relatively opposite direction. It will thus be seen that the linkage mechanism 100, 96 in this case behaves similarly to the connection bar 78 of FIGURES 3 and 4, with the difference that the linkage mechanism moves from right to left, or vice versa, under the effect of, on the one hand, the reaction forces in the link 10, which tend to cause the linkage mechanism to move to the left, and, on the other hand, the force exerted by the compression spring 94, which force tends to cause the linkage mechanism to move to the right. There will be an equilibrium position of the linkage mechanism, at which position two conditions must be fulfilled simultaneously; these conditions are:

(3) equal and opposite forces act upon the linkage mechanism, in the directions from right to left, and vice versa, of FIGURE 5, and also, (4) when condition (3) is fulfilled, the portion of the position-detecting rod 40 must be such that the hydraulic control mechanism 8 is not actuated to either raise the plow, or to permit the plow to descend.

It will be clear, furthermore, that variation of the magnitude of the external forces acting upon the plow will have the same effects as described with reference to FIGURES 3 and 4.

Where the lifting mechanism of FIGURE 5 is employed in the case where the tractor is used to push a weeding implement through the soil, then, again as described with reference to FIGURES 3 and 4, the external forces acting upon the weeding implement will normally result in the transmission, through the link 10 (FIGURE 5), of reaction forces in the direction opposite to that of the arrow V. Consequently, the link 10 and the rod 96 will tend to move to the right, drawing the pivot 101 to the right such that the arm 100 comes into contact with the fulcrum member 105. In this, second, mode of operation of the linkage mechanism 100, 96, the arm 100 is capable of pivotal movement about the fulcrum 105, and the arm 100 operates in a closely similar manner to that of the connection bar 18 of FIGURE 1, in the case where the link 10 is placed at the broken-line position 10'. It is thus believed that the operation of this mode of operation need not be further described.

Whereas examples of the invention have been described with reference to an agricultural tractor employed to pull a plowshare, or to push a weeding implement, through soil 112, it is to be understood that the invention is not limited to such applications, but may be applicable, more generally, to locomotive units arranged to propel implements which are neither plows nor weeding implements and which are not necessarily agricultural implements.

What we claim is:

1. A lifting mechanism having a mechanical linkage system connecting a tractor with an implement in a pushing or pulling arrangement, said linkage system including link means pivotally connected to said tractor and pivotably connectable with an implement, power means for raising said implement through said linkage system in response to the external draft forces operating on said implement in a pushing direction and a pulling direction, said power means comprising a normally neutralized hydraulic mechanism, displaceable detecting means for deneutralizing said power means, connection means operatively associated with said detecting means, said connection means being pivotable about a pivotable axis to displace said detecting means, said axis extending substantially transverse to the direction of travel, a resilient member connected to said connection means for opposing displacement of said detecting means, transmission means, said connection means being connectable with said link means and said transmission means on opposite sides of said axis, whereby said detecting means is responsive to torque exerted by said external forces on said implement in both directions, said forces being transmitted via said link means and said transmission means to displace said detection means in the same direction when the implement is pushed or pulled.

2. The invention of claim 1 wherein the transmission means is comprised of an adjustable pivot pin which alternatively connects said link means with said connecting means on opposite sides of said axis.

3. The invention of claim 1 wherein said link means includes a strut connected with said link means on one side of said axis, a tie, said tie, said tie connecting said implement to said connecting means on the opposite side of said axis.

4. The invention of claim 1 wherein the transmission means includes two struts pivotably connected to said connection means on opposite sides of said axis.

5. The invention of claim 4 wherein each strut has relatively movable parts that tend to move apart under tension and tend to move in engagement under compression.

6. The invention of claim 1 wherein said detecting means includes a responsive rod member associated with said resilient means, said rod member being displaceable responsive to said differences in torque.

7. The invention of claim 6 wherein said rod member is pivotably connected to a hydraulic valve and said power means is comprised of a hydraulic pump and motor, said valve normally blocking fluid from said pump to said motor whereby the shifting of said rod responsive to an increased torque exerted on said implement moves said valve and said motor is powered to raise said implement.

8. The invention of claim 7 wherein said hydraulic motor includes a piston and piston rod and a bell crank mechanism cooperates with said piston rod and lever means in said linkage system to raise said implement.

References Cited by the Examiner

UNITED STATES PATENTS

| | | | |
|---|---|---|---|
| 2,433,019 | 12/1947 | Arps | 37—144 XR |
| 2,443,884 | 6/1948 | Arps | 37—144 XR |
| 2,663,239 | 12/1953 | Rapp et al. | 172—10 |
| 2,721,508 | 10/1955 | Edman | 172—10 XR |
| 2,786,403 | 3/1957 | Senkowski et al. | 172—10 |
| 2,791,340 | 5/1957 | Haines et al. | 172—7 |
| 3,001,589 | 9/1961 | Bunting | 172—7 |
| 3,003,568 | 10/1961 | Merritt et al. | 172—9 |
| 3,013,350 | 12/1961 | Fox | 172—439 |

FOREIGN PATENTS

| | | |
|---|---|---|
| 1,264,410 | 5/1961 | France. |

ABRAHAM G. STONE, *Primary Examiner.*

T. GRAHAM CRAVER, *Examiner.*